(12) United States Patent
Lee

(10) Patent No.: US 7,191,360 B2
(45) Date of Patent: Mar. 13, 2007

(54) METHOD OF DATA BACKUP AND RECOVERY

(75) Inventor: Chang-ho Lee, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 615 days.

(21) Appl. No.: 10/625,680

(22) Filed: Jul. 24, 2003

(65) Prior Publication Data

US 2004/0153761 A1   Aug. 5, 2004

(30) Foreign Application Priority Data

Nov. 26, 2002  (KR)  ........................ 10-2002-0073807

(51) Int. Cl.
   *G06F 11/00* (2006.01)
(52) U.S. Cl. ........................ 714/15; 707/202
(58) Field of Classification Search .................... 714/7, 714/2, 15, 16; 707/202
   See application file for complete search history.

(56) References Cited

U.S. PATENT DOCUMENTS

| | | | |
|---|---|---|---|
| 5,276,860 A * | 1/1994 | Fortier et al. ................... | 714/6 |
| 5,276,867 A * | 1/1994 | Kenley et al. ............... | 707/204 |
| 5,907,673 A | 5/1999 | Hirayama et al. | |
| 6,366,987 B1 | 4/2002 | Tzelnic et al. | |
| 6,374,265 B1 | 4/2002 | Chen et al. | |
| 6,785,786 B1 * | 8/2004 | Gold et al. ................... | 711/162 |
| 2003/0182301 A1 * | 9/2003 | Patterson et al. ............ | 707/102 |
| 2005/0216788 A1 * | 9/2005 | Mani-Meitav et al. ......... | 714/6 |

FOREIGN PATENT DOCUMENTS

| | | |
|---|---|---|
| JP | 61-2564444 | 11/1986 |
| JP | 6-259301 | 9/1994 |
| KR | 1998-24086 | 7/1998 |
| KR | 2001-4069 | 1/2001 |
| KR | 2001-56748 | 7/2001 |
| WO | WO 01/04797 A1 | 1/2001 |

\* cited by examiner

*Primary Examiner*—Dieu-Minh Le
(74) *Attorney, Agent, or Firm*—Staas & Halsey LLP

(57) ABSTRACT

A method of backing up and recovering data in a data processing system is disclosed. The method includes selecting files to be backed up, and determining where to save selected files; loading a project file to manage backup information on the selected file; building a baseline in the project file; backing up the selected files with the baseline, and updating a backup file DB including information on storage addresses where the selected files are saved; and completing data backup by saving an updated backup file database (DB) in the project file. With this configuration, the present invention provides a method for backing up and recovering data by using a baseline, in which a baseline is built in a project file whenever data backup is performed, so that not only is the data easily backed-up and recovered even if the data backup is repeatedly performed and an amount of data is managed, but also a space of a storage unit that is used to store the backup files is efficiently used.

22 Claims, 4 Drawing Sheets

METHOD OF DATA BACKUP AND RECOVERY

CROSS-REFERENCE TO RELATED APPLICATIONS

This application claims the benefit of Korean Patent Application No. 2002-73807, filed Nov. 26, 2002, in the Korean Intellectual Property Office, the disclosure of which is incorporated herein by reference.

BACKGROUND OF THE INVENTION

1. Field of the Invention

The present invention relates to a data processing system, and more particularly, to a method of backing up and recovering data in a data processing system.

2. Description of the Related Art

In a data processing system such as a computer, data recorded in a file form needs to be backed-up to protect against a crash of the data processing system or for future contingencies, thereby recovering original data. A user can personally back up and recover a file, but as the amount of data to be managed is increased, it is difficult for a user to periodically make the backup or to back up and recover a file to be selected one by one.

Accordingly, recently, various application software has been developed to improve convenience for data backup and recovery. The processes of data backup and data recovery using such application software will be described hereinbelow.

In the data processing system, data recorded in the file form is electromagnetically stored in a storage unit such as a hard disk. As shown in FIG. 3, the process of backing up the stored data is as follows. First, a user selects files to be backed up (S100), and determines where to save backup files (S101). Then, when a user orders the data backup to begin (S102), a new project file is created for saving information on the backup files, or an old project file created at the last backup process is loaded (S103~S105). While the data backup is performed (S106), the information on the backup files is added into the project file, thereby completing the data backup (S107).

Further, as shown in FIG. 4, the process of recovering the backup files is as follows. First, a user loads the project file (S110), and selects the backup files to be recovered (S11). Then, when a user orders the data recovery to begin (S112), the backup file is recovered (S113), thereby completing the data recovery (S114).

In the conventional method for the data backup, after files (e.g., a file 1, a file 2, a file 3 and a file 4) whose information is saved in the project file are initially backed up (i.e., after a first backup process), if there is a changed file (e.g., the file 1 is changed into a file 1.1) among the backup files, the information on only the changed file (the file 1.1) is added into the project file when the data backup is subsequently performed (i.e., in a second backup process). Therefore, the other backup files which are not changed are not electromagnetically stored in the storage unit again at the second backup process. Moreover, such unchanged backup files are not treated as files which are logically backed up together with the changed file. That is, the project file of the first backup process includes the information on the file 1, the file 2, the file 3 and the file 4, but the project file of the second backup process includes the information on only the file 1.1. Thus, in the case of recovering the backup files of a specific backup process (e.g., the second backup process), only the files (e.g., the file 1.1) which are backed up at the specific backup process are recovered, so that the files related to each other are not all recovered. In order to recover the related files, a user must remember the specific backup process and select the related files. Hence, in the case that the data backup is repeatedly performed and an amount of data is managed, the data backup and recovery are not easy.

SUMMARY OF THE INVENTION

Accordingly, it is an aspect of the present invention to provide a method of backing up and recovering data by using a baseline.

Additional aspects and advantages of the present invention will be set forth in part in the description that follows and, in part, will be obvious form the description, or may be learned by practicing the present invention.

The foregoing and/or other aspects of the present invention are achieved by providing a method of backing up and recovering data in a data processing system, comprising selecting files to be backed up, and determining where to save selected files; loading a project file to manage backup information on the selected file; building a baseline in the project file; backing up the selected files with the baseline, and updating a backup file database (DB) including information on storage addresses where the selected files are saved; and completing data backup by saving an updated backup file DB in the project file.

According to an aspect of the invention, the baseline includes information on time of when the data backup is performed and information on the selected files to be backed up.

According to an aspect of the invention, in a case that there is a changed or new created file in the data processing system after the data backup is performed, the updating the backup file DB includes logically linking the storage addresses of unchanged files of the selected files.

According to an aspect of the invention, the loading the project file includes creating the project file to manage the backup information on the selected file, and the updating the backup file DB includes creating the backup file DB including the information on the storage addresses.

According to an aspect of the invention, after the data backup is performed, the method further comprises loading the project file; selecting the baseline related to the selected files to be recovered among baselines of the project file; and recovering the selected files recorded in the backup file DB based on a selected baseline.

According to an aspect of the invention, after the data backup is performed, the method further comprises loading the project file; selecting the baseline related to the selected files to be recovered among baselines of the project file; and recovering the selected files recorded in the backup file DB based on a selected baseline.

According to an aspect of the invention, after the data backup is performed, the method further comprises loading the project file; selecting the baseline related to the selected files to be recovered among baselines of the project file; and recovering the selected files recorded in the backup file DB based on a selected baseline.

BRIEF DESCRIPTION OF THE DRAWINGS

These and/or other aspects and advantages of the present invention will become apparent and more readily appreciated from the following description of the embodiments, taken in conjunction with the accompany drawings of which.

Figure 1:
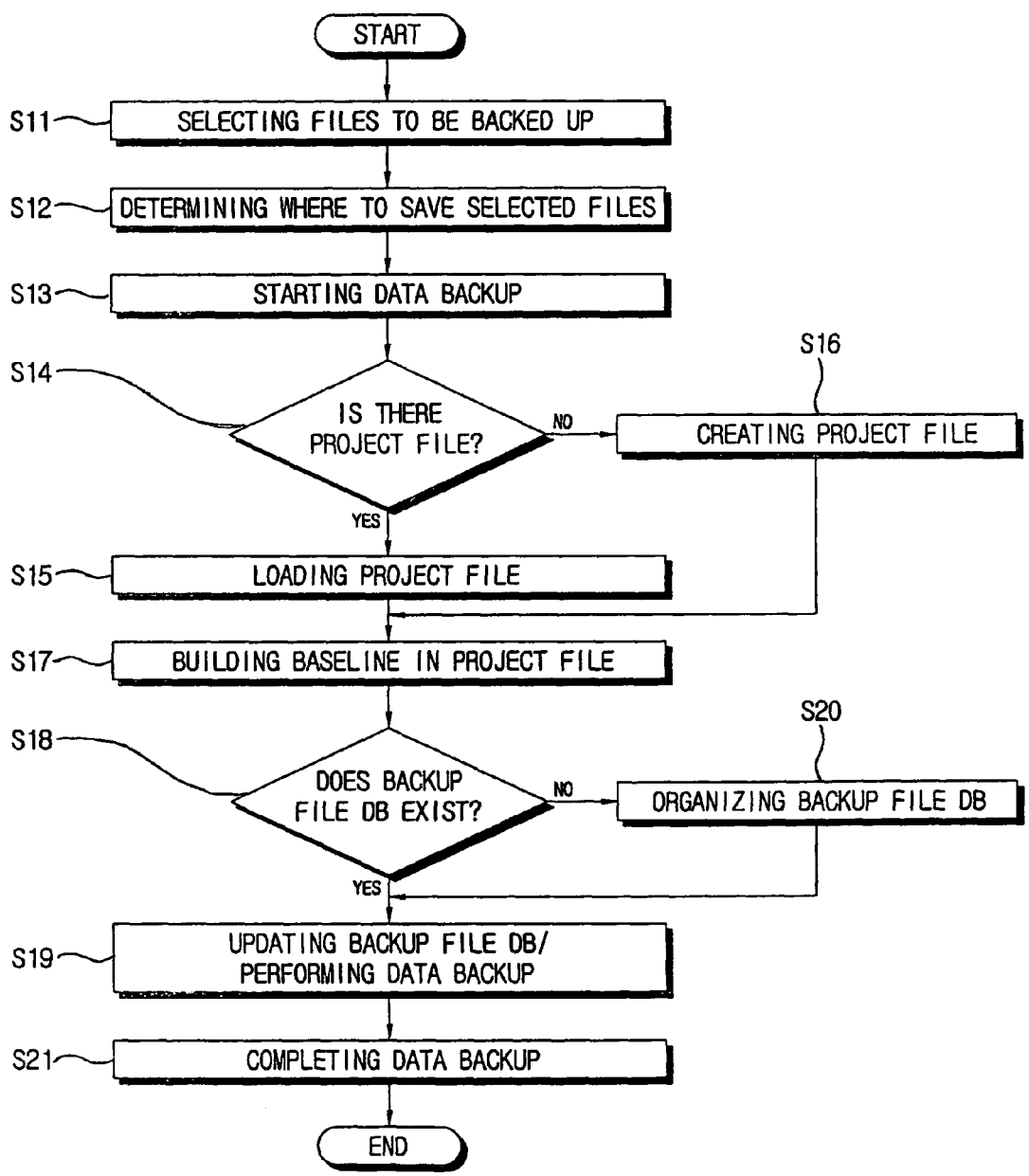
FIG. 1 is a flowchart of a method of backing up data according to an embodiment of the present invention.

DETAILED DESCRIPTION OF THE
PREFERRED EMBODIMENTS

Reference will now be made in detail to the embodiments of the present invention, examples of which are illustrated in the accompanying drawings, wherein like reference numerals refer to like elements throughout. The embodiments are described below in order to explain the present invention by referring to the figures.

In a data processing system using a method of data backup and recovery according to the present invention, data recorded in file form is physically or electromagnetically stored in a storage unit. The storage unit generally has high speed and large storage capacity, and includes a hard disk, an optical disk, a RAID (redundant array of independent disks) system, etc. The data processing system uses an operating system such as WINDOWS, etc. supporting application software used to back up and recover data according to the present invention. The data backup and recovery software includes a driver that logically interacts with hardware components of the data processing system.

Thus, a user can back up and recover data recorded in file form by using the data backup and recovery software, and the process of backing up and recovering data will be described with reference to accompanying drawings.

FIG. 1 is a flowchart of a method of backing up data according to the present invention. As shown therein, a user first selects files to be backed up (S11), and determines where to save backup files selected by a user (S12). Then, when a user orders the data backup of selected files to begin (S13), it is determined whether a project file for saving information on the backup files exists (S14). When the project file exists, the project file is loaded (S15). Conversely, when there is no project file, a new project file is created (S16). According to the present invention, because the project file is created once when the data backup is first performed in the data processing system, the existing project file is preferably loaded when the data backup is performed later on. Then, a baseline is built in the loaded or created project file so as to set up information on time of when the data backup is performed and backup information on the files related to each other being selected by a user (S17).

Preferably, whenever the data backup is performed, the baseline is newly built in the project file, being discriminated from the old baseline. That is, the new baseline can be labeled "backup time" whenever the data backup is performed, thereby being discriminated from the old base line. For example, in the case that the data backup is dated Jan. 1, 2002, the baseline is labeled "20020101", and in the case that the data backup is dated Feb. 1, 2002, the baseline is labeled "20020201". However, the baseline may be labeled in different formats as necessary.

Thereafter, while the selected files are backed up together with the baseline, an index of the files related to the files to be backed up and an index of the related files to be backed up together are collectively recorded in a backup file DB (database) (S19). Herein, if the data backup is first performed, it is determined whether the backup file DB exists or not (S18). When there is no backup file DB, the new backup file DB is newly organized (S20), but when the backup file DB exists, the backup file DB is just updated (S19).

The backup file DB corresponding to each baseline includes the indexes of the backup files. Further, the indexes of the backup files recoded in the backup file DB are linked to storage addresses of the storage unit, respectively.

According to the present invention, for example, when the data backup is first performed in Jan. 1, 2002, the project file is created, and the baseline of the related files (e.g., a file A, a file B, a file C and a file D) labeled "20020101" are saved in the project file, with the backup file DB recording every index of the backup files. Thereafter, there is a changed file (e.g., the file A is changed into a file AA), and therefore when the related files (e.g., the file AA, the file B, the file C and the file D) are backed up again on Feb. 1, 2002, the project file is loaded and the baseline thereof is set up by "20020201", with the backup file DB being updated by every index of the backup files. At this time, the file AA changed from the file A is electromagnetically stored in the storage unit, and the storage address thereof is recorded in the backup file DB. Conversely, the unchanged files such as the file B, the file C and the file D are not electromagnetically stored in the storage unit, and the updated backup file DB for the unchanged files is just logically linked to the backup file DB having the baseline of "20020101".

In the method of data backup and recovery according to the present invention, the unchanged files are not electromagnetically stored in the storage unit again, like the conventional method when the data backup is performed later on. However, contrary to the conventional method, such unchanged backup files are treated as files which are logically backed up together with the changed file. That is, the baseline of "20020101" includes the information on the file A, the file B, the file C and the file D, and the baseline of "20020201" includes the information on the file AA, the file B, the file C and the file D.

With this process, when the selected files are all backed up (S21), the loaded project file is saved, thereby completing the data backup. Herein, the backup file DB may be managed being included in the project file, or separately from the project file.

Figure 2:
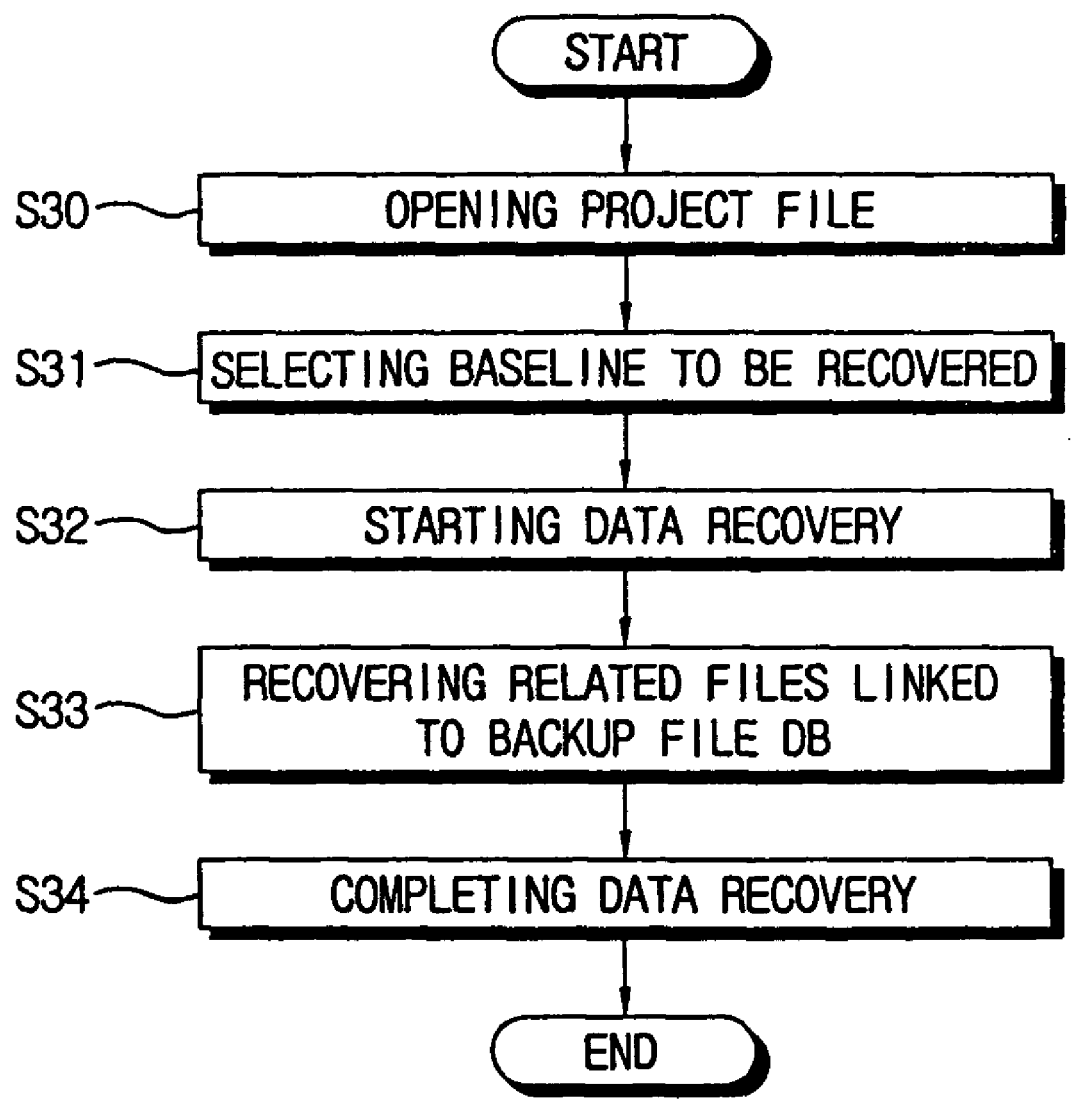
FIG. 2 is a flowchart of a method of recovering data according to an embodiment of the present invention.
Figure 3:
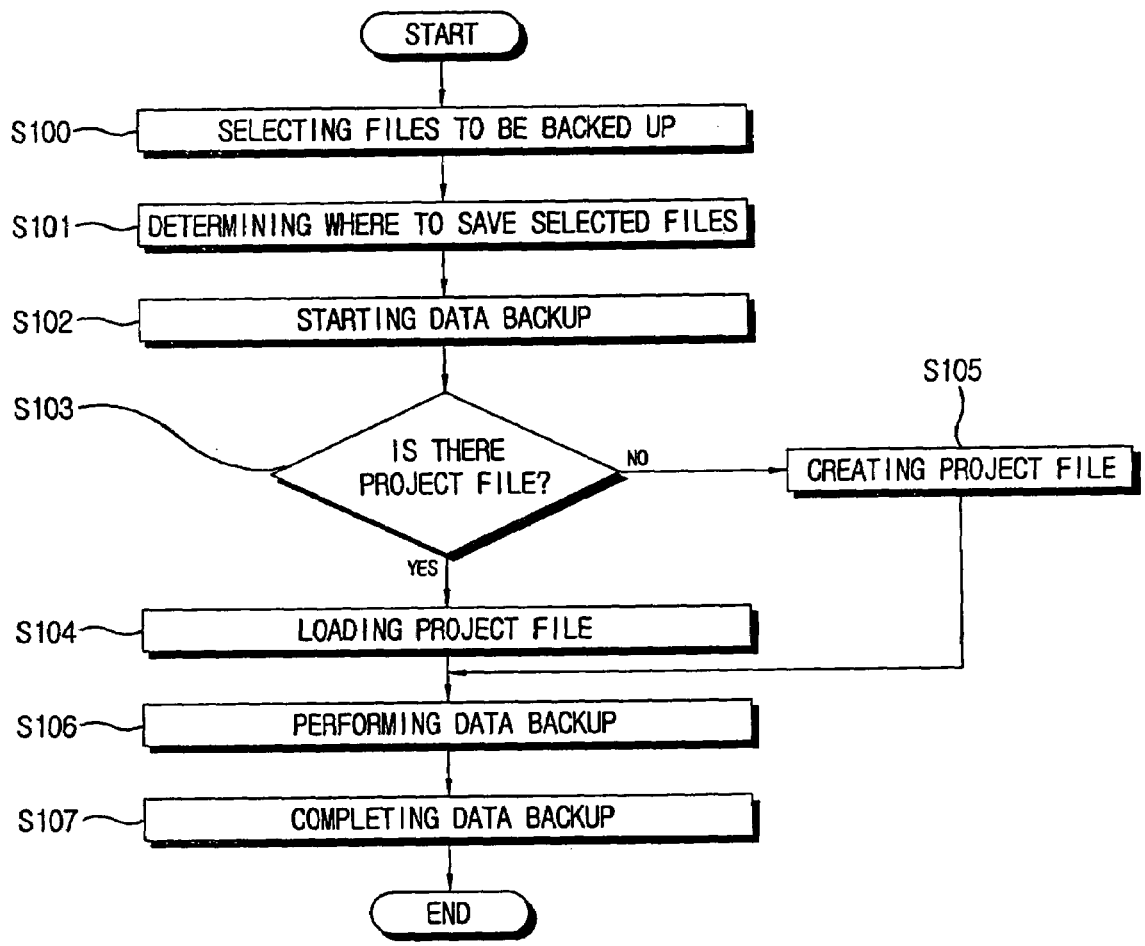
FIGS. 3 and 4 are flowcharts of a conventional method of backing up and recovering data, respectively.
Figure 4:
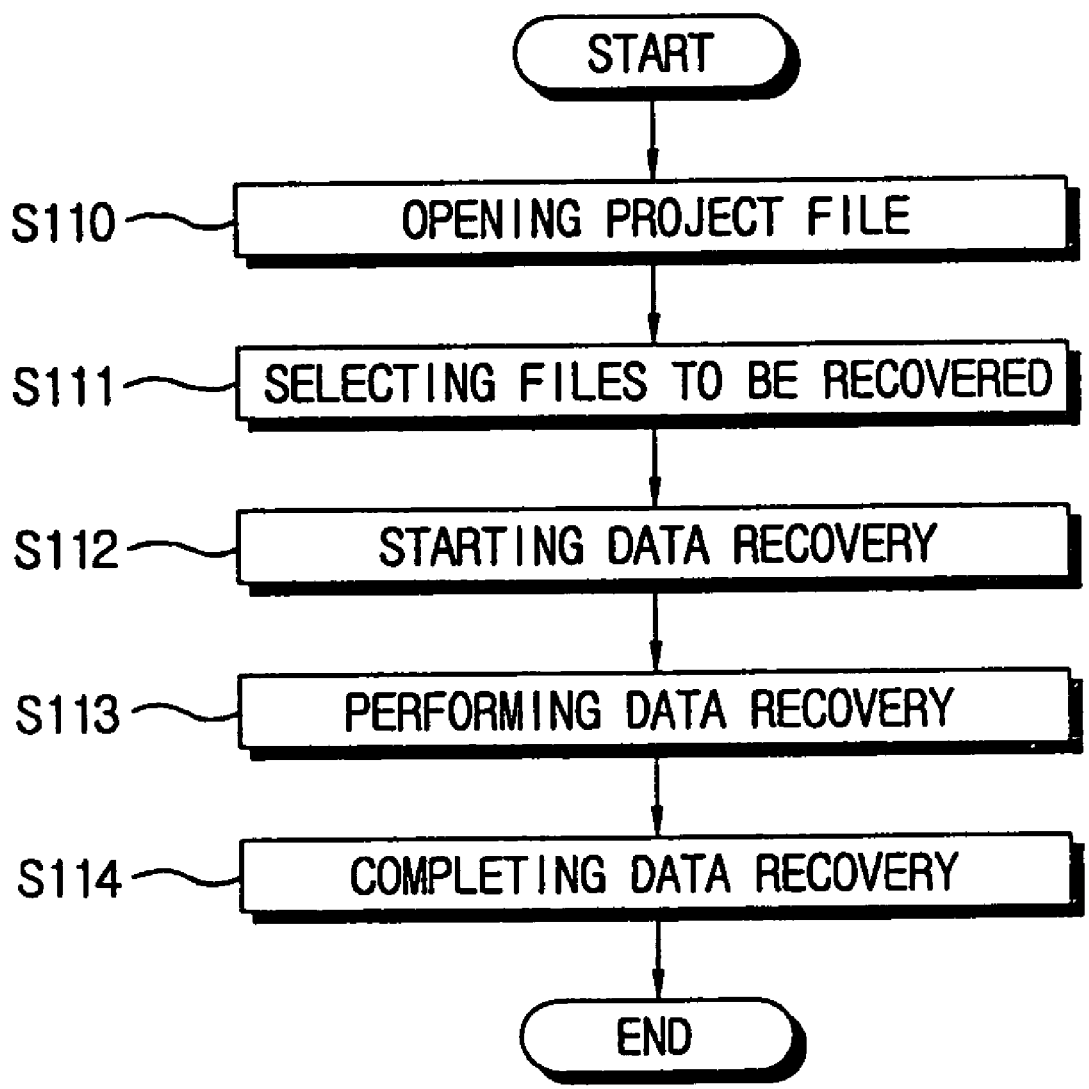

The process of recovering the backup files by using the baseline will be described with reference to FIG. 2. In order to recover the backup files, a user first loads the project file (S30). Then, a user opens the loaded project file and selects the baseline related to the backup files to be recovered (S31). Then, when a user orders the data recovery to begin according to a selected baseline (S32), the backup files are recovered (S33). At this time, the related files are recovered from the storage addresses of the storage unit linked to the backup file DB with reference to the indexes of the backup file related to the selected baseline in the backup file DB, thereby completing the data recovery (S34).

As described above, when the baseline of "20020201" is selected so as to recover the backup files backed up in Feb. 1, 2002, not only the changed file (the file M) physically backed up in Feb. 1, 2002 is recovered but also the unchanged files (the file B, the file C and the file D) logically linked to each other in the backup file DB are recovered. Consequently, the related files set up in the baseline can be all recovered.

According to the present invention, in order to recover all related backup files, a user just selects the baseline of backup time without remembering each backup time of every file.

Therefore, in the case that the data backup is repeatedly performed and an amount of data is managed, the data backup and recovery are easy. Further, in the case that a user periodically backs-up data, the data backup is performed, automatically building the baseline in the project file, thereby facilitating the data recovery.

In the conventional method of the data backup and recovery, only the last changed file is backed up, so that the data recovery is limited to the last backup file. However, according to the present invention, the baseline is automatically set up when the data backup is performed, so that the data recovery is possible in correspondence to every baseline.

On the other hand, in order to recover all related backup files, if all related backup files are electromagnetically stored in correspondence to every baseline, the space of the storage unit occupied with the backup files is increased whenever the data backup is performed, thereby causing a shortage of a storing space. However, according to the present invention, only the changed backup files are electromagnetically stored in the storage unit, and the unchanged backup files are just treated as files which are logically stored in the storage unit, thereby decreasing the space of the storage unit occupied with the backup files.

As described above, the present invention provides a method of backing up and recovering data by using a baseline, in which a baseline is built in a project file whenever data backup is performed, so that not only the data backup and data recovery are easy even if the data backup is repeatedly performed and an amount of data is managed, but also a space of a storage unit occupied with the backup files is efficiently used.

The hardware included in the system may include memories, processors, and/or Application Specific Integrated Circuits ("ASICs"). Such memory may include a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other form of propagated signals (e.g., carrier waves, infrared signals, digital signals, etc.), etc.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of backing up and recovering data in a data processing system, comprising:
    selecting files to be backed up, and determining where to save the selected files;
    loading a project file to manage backup information on the selected files;
    building a baseline in the project file;
    backing up the selected files with the baseline, and updating a backup file database including information on storage addresses where the selected files are saved; and
    completing data backup by saving an updated backup file database in the project file.

2. The method according to claim 1, wherein the baseline includes information on time of when the data backup is performed and information on the selected files to be backed up.

3. The method according to claim 2, wherein in a case that there is a changed or new created file in the data processing system after the data backup is performed, the updating the backup file database includes logically linking the storage addresses of unchanged files of the selected files.

4. The method according to claim 1, wherein the loading the project file includes creating the project file to manage the backup information on the selected file, and
    the updating the backup file database includes creating the backup file database including the information on the storage addresses.

5. The method according to claim 2, after the data backup is performed, further comprising:
    loading the project file;
    selecting the baseline related to the selected files to be recovered among baselines of the project file; and
    recovering the selected files recorded in the backup file database based on the selected baseline.

6. The method according to claim 3, after the data backup is performed, further comprising:
    loading the project file;
    selecting the baseline related to the selected files to be recovered among baselines of the project file; and
    recovering the selected files recorded in the backup file database based on the selected baseline.

7. The method according to claim 4, after the data backup is performed, further comprising:
    loading the project file;
    selecting the baseline related to the selected files to be recovered among baselines of the project file; and
    recovering the selected files recorded in the backup file database based on the selected baseline.

8. A machine-readable medium that provides instructions, which, when executed by a machine, cause the machine to perform operations for backing up and recovering data in a data processing system comprising:
    selecting files to be backed up, and determining where to save the selected files;
    loading a project file to manage backup information on the selected files;
    building a baseline in the project file;
    backing up the selected files with the baseline, and updating a backup file database including information on storage addresses where the selected files are saved; and
    completing data backup by saving an updated backup file database in the project file.

9. The machine-readable medium of claim 8, wherein the baseline includes information on time of when the data backup is performed and on the selected files to be backed up.

10. The machine-readable medium of claim 9, wherein in a case that there is a changed or new created file in the data processing system after the data backup is performed, the updating the backup file database includes logically linking the storage addresses of unchanged files of the selected files.

11. The machine-readable medium of claim 8,
    wherein the loading the project file includes creating the project file to manage the backup information on the selected file, and wherein the updating the backup file database includes creating the backup file database including the information on the storage addresses.

12. The machine-readable medium of claim 9, wherein the instructions cause the machine, after the data backup is performed, to perform operations further comprising:
    loading the project file;
    selecting the baseline related to the selected files to be recovered among baselines of the project file; and
    recovering the selected files recorded in the backup file database based on the selected baseline.

13. The machine-readable medium of claim 10, wherein the instructions cause the machine, after the data backup is performed, to perform operations further comprising:
    loading the project file;
    selecting the baseline related to the selected files to be recovered among baselines of the project file; and
    recovering the selected files recorded in the backup file database based on the selected baseline.

14. The machine-readable medium of claim 11, wherein the instructions cause the machine, after the data backup is performed, to perform operations further comprising:
    loading the project file;
    selecting the baseline related to the selected files to be recovered among baselines of the project file; and
    recovering the selected files recorded in the backup file database based on the selected baseline.

15. A method of backing up data, comprising: building a first baseline comprising information on when a backup of a first plurality of files will occur, wherein the first baseline is built in a project file;
    recording, in a first backup file database that is associated with the first baseline, storage addresses of the first plurality of files to be backed up and an index of the first plurality of files to be backed up; and
    logically linking the first backup file database to a second backup file database that is associated with a second baseline, wherein the second backup file database comprises storage addresses of a second plurality of files that have been previously backed up and an index of the second plurality of files that have been previously backed up, and wherein the first baseline is different from the second baseline.

16. The method of claim 15, wherein the information on when a backup of the first plurality of files will occur comprises at least one of a time and a date.

17. A machine-readable medium that provides instructions, which, when executed by a machine, cause the machine to perform operations for backing up data comprising:
    building a first baseline comprising information on when a backup of a first plurality of files will occur, wherein the first baseline is built in a project file;
    recording, in a first backup file database that is associated with the first baseline, storage addresses of the first plurality of files to be backed up and an index of the first plurality of files to be backed up; and
    logically linking the first backup file database to a second backup file database that is associated with a second baseline, wherein the second backup file database comprises storage addresses of a second plurality of files that have been previously backed up and an index of the second plurality of files that have been previously backed up, and wherein the first baseline is different from the second baseline.

18. The machine-readable medium of claim 17, wherein the information on when a backup of the first plurality of files will occur comprises at least one of a time and a date.

19. A method of recovering backed-up data, comprising: selecting a first baseline built in a project file, wherein the first baseline comprises information on when a first plurality of files were backed-up;
    determining storage addresses of the first plurality of files from a first backup file database that is associated with the first baseline;
    determining storage addresses of a second plurality of files that were backed-up from a second backup file database that is associated with a second baseline, wherein the first baseline is different than the second baseline, and wherein the second backup file database is logically linked to the first backup file database; and
    recovering the first plurality of files and the second plurality of files.

20. The method of claim 19, wherein the information on when the first plurality of files were backed-up comprises at least one of a time and a date.

21. A machine-readable medium that provides instructions, which, when executed by a machine, cause the machine to perform operations for recovering backed-up data comprising:
    selecting a first baseline built in a project file, wherein the first baseline comprises information on when a first plurality of files were backed-up;
    determining storage addresses of the first plurality of files from a first backup file database that is associated with the first baseline;
    determining storage addresses of a second plurality of files that were backed-up from a second backup file database that is associated with a second baseline, wherein the first baseline is different than the second baseline, and wherein the second backup file database is logically linked to the first backup file database; and
    recovering the first plurality of files and the second plurality of files.

22. The machine-readable medium of claim 21, wherein the information on when the first plurality of files were backed-up comprises at least one of a time and a date.

* * * * *

UNITED STATES PATENT AND TRADEMARK OFFICE
CERTIFICATE OF CORRECTION

PATENT NO. : 7,191,360 B2  
APPLICATION NO. : 10/625680  
DATED : March 13, 2007  
INVENTOR(S) : Chang-ho Lee Page 1 of 1

It is certified that error appears in the above-identified patent and that said Letters Patent is hereby corrected as shown below:

On The Title Page, Item -56- (Foreign Patent Documents), after "JP" change "61-2564444" to --61-256444--.

Signed and Sealed this

Twenty-sixth Day of June, 2007

JON W. DUDAS  
*Director of the United States Patent and Trademark Office*